United States Patent
Shinohara

(10) Patent No.: US 9,906,684 B2
(45) Date of Patent: Feb. 27, 2018

(54) IMAGE FORMING APPARATUS FOR FORMING IMAGE BY READING DOCUMENT, CONTROL METHOD OF THE IMAGE FORMING APPARATUS, AND STORAGE MEDIUM

(71) Applicant: CANON KABUSHIKI KAISHA, Tokyo (JP)

(72) Inventor: Taku Shinohara, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/182,368

(22) Filed: Jun. 14, 2016

(65) Prior Publication Data
US 2016/0381246 A1    Dec. 29, 2016

(30) Foreign Application Priority Data
Jun. 23, 2015   (JP) ................................ 2015-125287

(51) Int. Cl.
*H04N 1/393* (2006.01)
*H04N 1/00* (2006.01)
*H04N 1/203* (2006.01)
*H04N 1/21* (2006.01)

(52) U.S. Cl.
CPC ......... *H04N 1/393* (2013.01); *H04N 1/00411* (2013.01); *H04N 1/00708* (2013.01); *H04N 1/2032* (2013.01); *H04N 1/2104* (2013.01); *H04N 2201/0081* (2013.01); *H04N 2201/0094* (2013.01)

(58) Field of Classification Search
CPC .............. H04N 1/393; H04N 1/00411; H04N 1/00708; H04N 2201/0081
USPC ....... 358/1.2, 1.9, 1.15, 1.17, 1.18, 505, 528
See application file for complete search history.

(56) References Cited

U.S. PATENT DOCUMENTS

| | | | |
|---|---|---|---|
| 6,269,190 B1 * | 7/2001 | Mikkelsen | G06T 11/60 382/232 |
| 2002/0069228 A1 * | 6/2002 | Mori | G06K 15/00 715/201 |
| 2003/0202211 A1 * | 10/2003 | Yudasaka | H04N 1/3875 358/1.18 |

FOREIGN PATENT DOCUMENTS

JP          2012-060491 A       3/2012

* cited by examiner

*Primary Examiner* — Jamares Q Washington
(74) *Attorney, Agent, or Firm* — Canon U.S.A., Inc. IP Division

(57) ABSTRACT

When a reading operation in a magnification setting is performed, an image at a position intended by a user can be magnified and output, and an output product intended by the user can be provided in a similar manner in either case of a regular size mode and an adjustable size mode while an efficient memory use is realized.

8 Claims, 15 Drawing Sheets

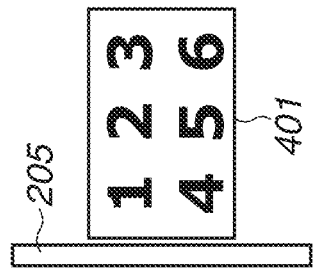
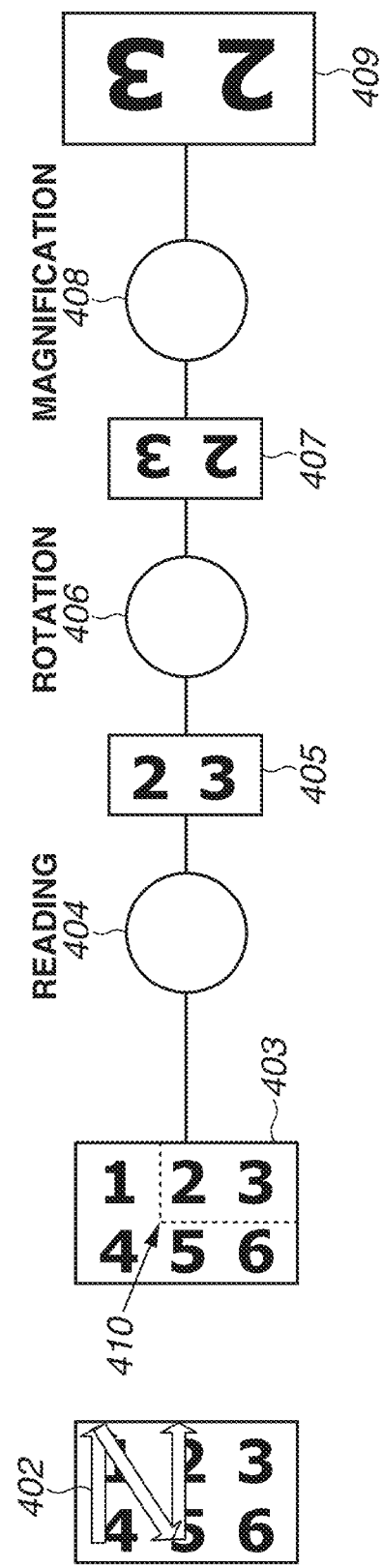

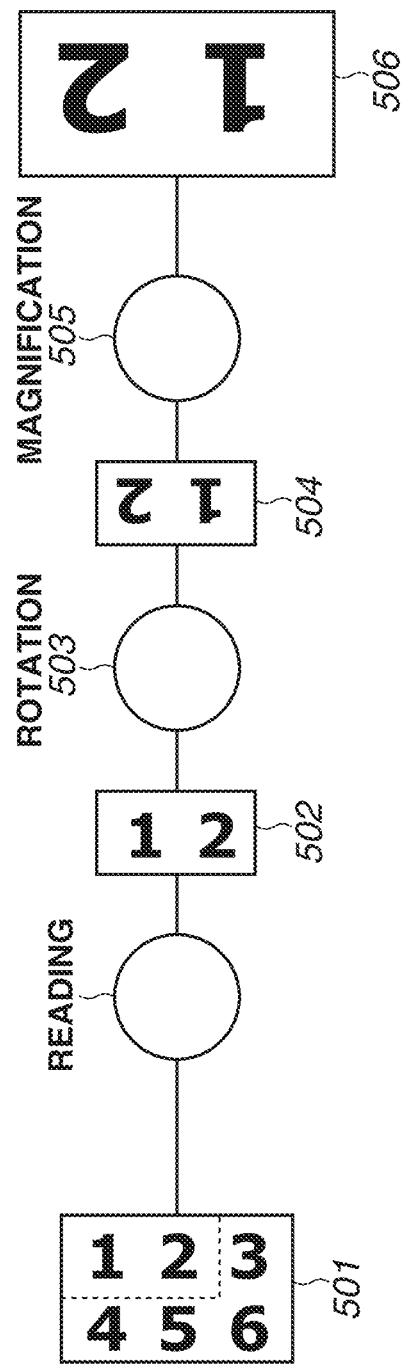

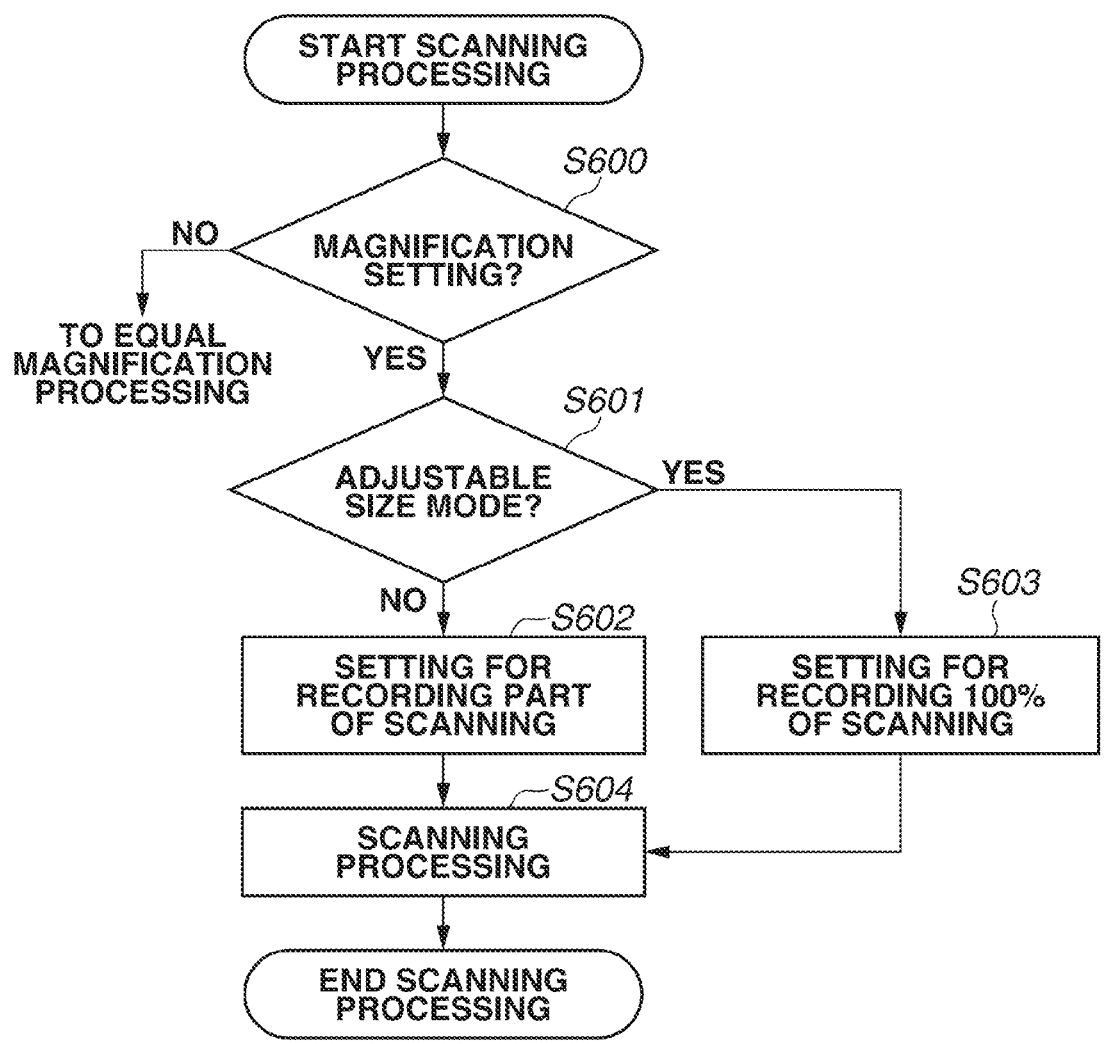

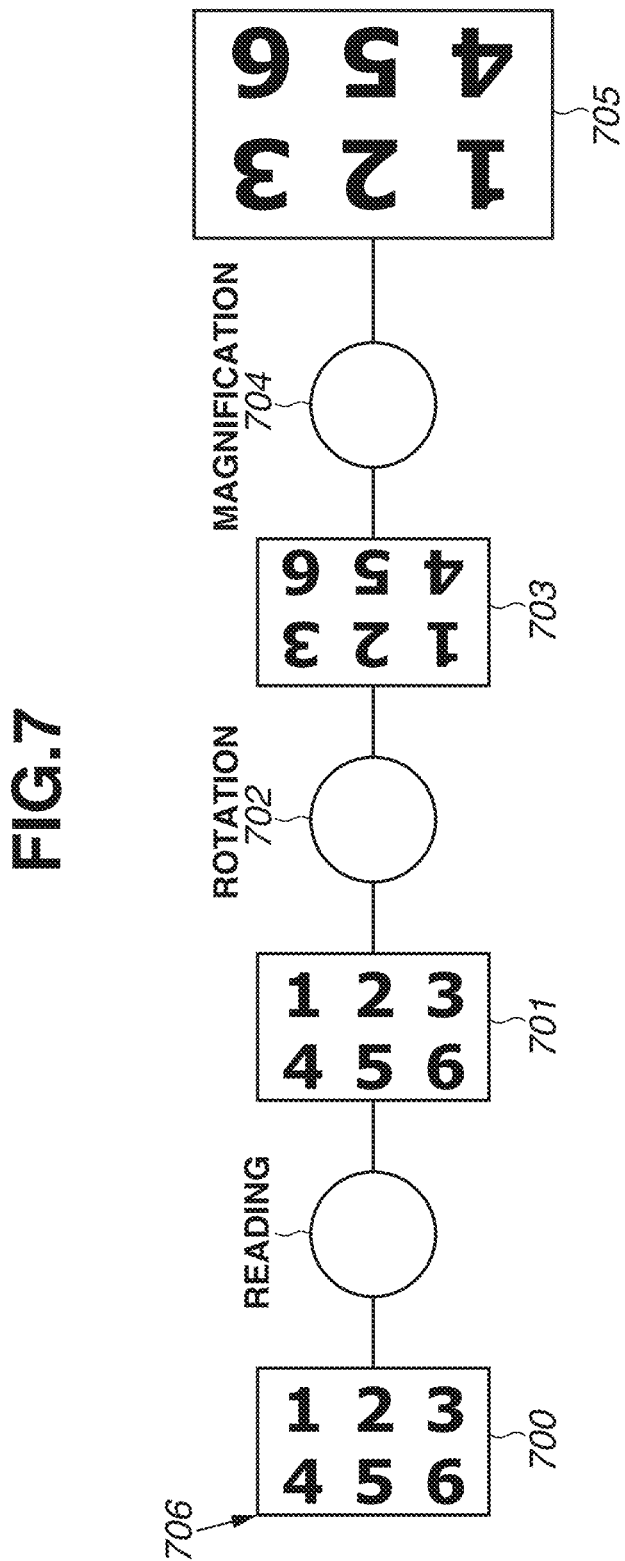

IMAGE FORMING APPARATUS FOR FORMING IMAGE BY READING DOCUMENT, CONTROL METHOD OF THE IMAGE FORMING APPARATUS, AND STORAGE MEDIUM

BACKGROUND OF THE INVENTION

Field of the Invention

The present invention relates to an image forming apparatus, a control method of the image forming apparatus, and a storage medium.

Description of the Related Art

As sizes of document images to be scanned, there are not only regular sizes such as A4 and A3 but also arbitrary sizes of documents created by users. When such an irregular size document is scanned, an operation of a mode (hereinbelow, referred to as an adjustable size mode) has been known which determines a document size while scanning by a reading apparatus without causing a user to input the document size.

In addition, an operation has been known in which a document image is not entirely stored in a memory, but only a portion thereof needed after enlargement is stored in the memory when being scanned and enlarged in order to reduce a usage amount of the memory when the scan operation is performed in an enlargement setting. Since only a portion of an image is processed, a processing man-hour can also be reduced, and performance can be improved.

In addition, a technique has been known which realizes an efficient memory use by switching a memory to be used according to a magnification ratio (see Japanese Patent Application Laid-Open No. 2012-60491).

However, when the scan operation is performed in the enlargement setting, a document size cannot be determined before scanning in the adjustable size mode, and thus there is a case that it is not sure which portion should be extracted in the scanning to enlarge an image at a position intended by a user, and an output is not what the user intended.

SUMMARY OF THE INVENTION

According to an aspect of the present invention, an image forming apparatus includes a reading unit configured to read a document to generate image data, a storage unit configured to store the image data generated by the reading unit, a setting unit configured to perform a magnification setting for varying magnification of the image data stored in the storage unit, and a control unit configured to, in the case where the setting unit performs the magnification setting and a document size to be read by the reading unit is able to be determined before reading, perform control to execute first processing for not writing image data of an entire page generated by the reading unit reading one page of a document in the storage unit but writing image data of only a portion necessary for an image after varying the magnification in response to the magnification setting in the storage unit, and in the case where the document size is not able to be determined before reading, perform control to execute second processing for writing image data of an entire page generated by the reading unit reading one page of the document in the storage unit.

Further features of the present invention will become apparent from the following description of exemplary embodiments with reference to the attached drawings.

BRIEF DESCRIPTION OF THE DRAWINGS

FIGS. 4A and 4B illustrate a magnification control operation of a regular size.

FIG. 5 illustrates an operation when a magnification control operation of the adjustable size mode is processed similarly to that of the regular size.

FIG. 6 is a flowchart illustrating an example of a magnification control operation according to a first exemplary embodiment.

FIG. 7 illustrates a magnification control operation of an adjustable size mode according to the first exemplary embodiment.

DESCRIPTION OF THE EMBODIMENTS

Various exemplary embodiments of the present invention will be described in detail below with reference to the attached drawings. The exemplary embodiments which will be described below do not restrict to the invention according to the claims. All of combinations of the features described in the exemplary embodiments are not always essential to the means for solution according to the invention.

Figure 1:
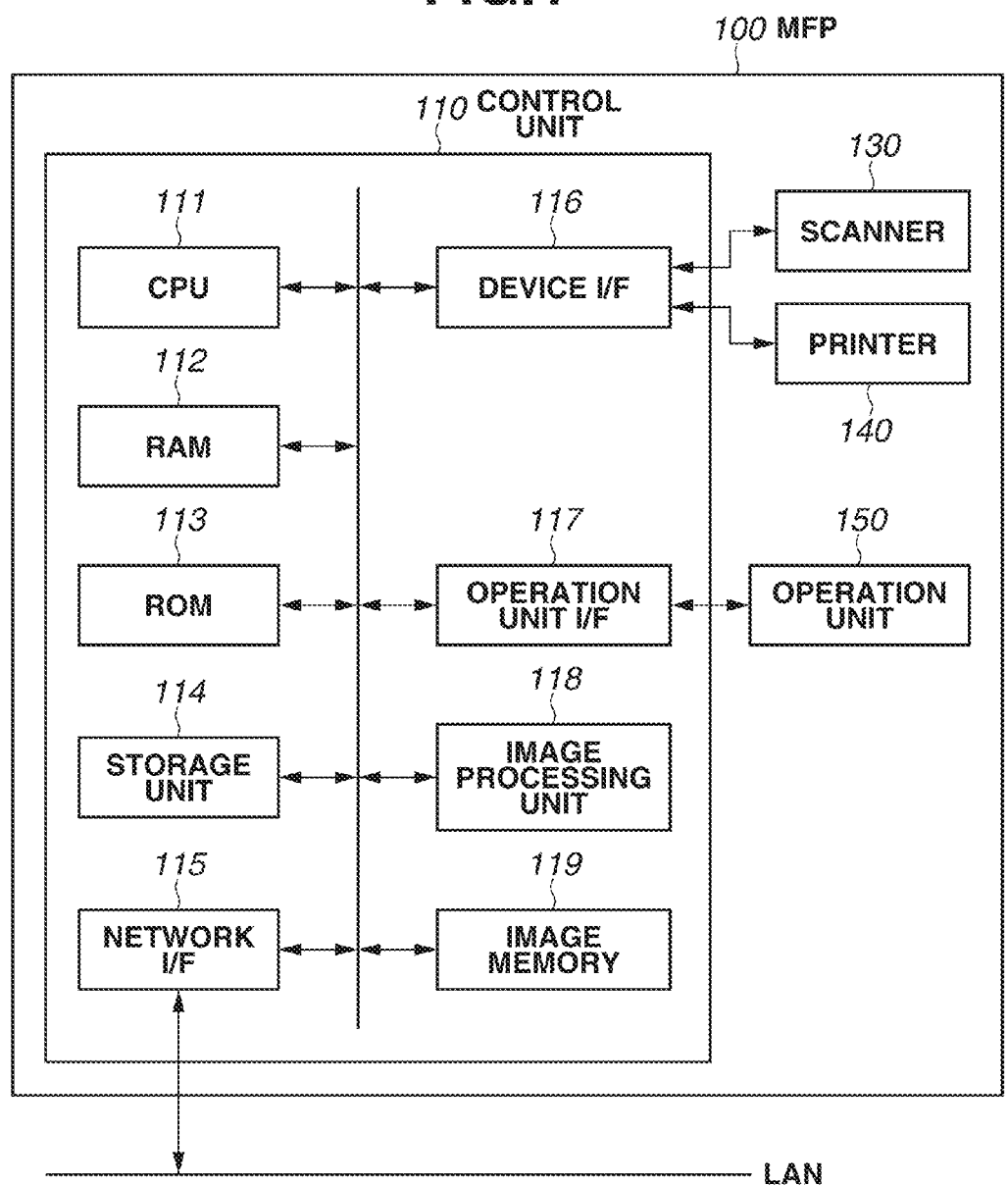
FIG. 1 is a block diagram illustrating an image forming apparatus according to an exemplary embodiment.

FIG. 1 is a block diagram illustrating an example of a configuration of a multifunction peripheral (MFP) 100 as an image forming apparatus according to a first exemplary embodiment of the present invention.

In the MFP 100, a control unit 110 is connected to a scanner 130 as an image input device and a printer 140 as an image output device and controls input and output of image information. On the other hand, the control unit 110 is connected to a local area network (LAN) and receives a print job or the like via the LAN.

A central processing unit (CPU) 111 controls an operation of the MFP 100 and operates based on a program read by a read-only memory (ROM) 113 and a random access memory (RAM) 112. The ROM 113 is a boot ROM and stores a boot program of a system. A storage unit 114 stores system software, image data, a program for controlling the operation of the MFP 100, and the like. The program stored in the storage unit 114 is loaded to the RAM 112, and the CPU 111 controls the operation of the MFP 100 based on the program.

A network interface (I/F) 115 is connected to the LAN and controls input and output of various information pieces via the network. A device I/F 116 connects the scanner 130 and the printer 140 as image input/output devices with the control unit 110 and performs conversion between synchronous and asynchronous systems of image data.

An operation unit I/F 117 is an interface for connecting an operation unit 150 with the control unit 110 and outputs image data to be displayed on the operation unit 150 to the operation unit 150. Further, the operation unit I/F 117 transmits information input by a user from the operation unit 150 to the CPU 111.

An image processing unit 118 performs image processing on print data received via the LAN and performs image processing on image data input from and output to the device I/F 116. An image memory 119 is a memory for temporarily developing image data to be processed by the image processing unit 118.

According to the present exemplary embodiment, the image forming apparatus of the present invention is described using the MFP as an example, however, the present invention can be applied to a reading apparatus which is not provided with the printer 140.

Figure 2:
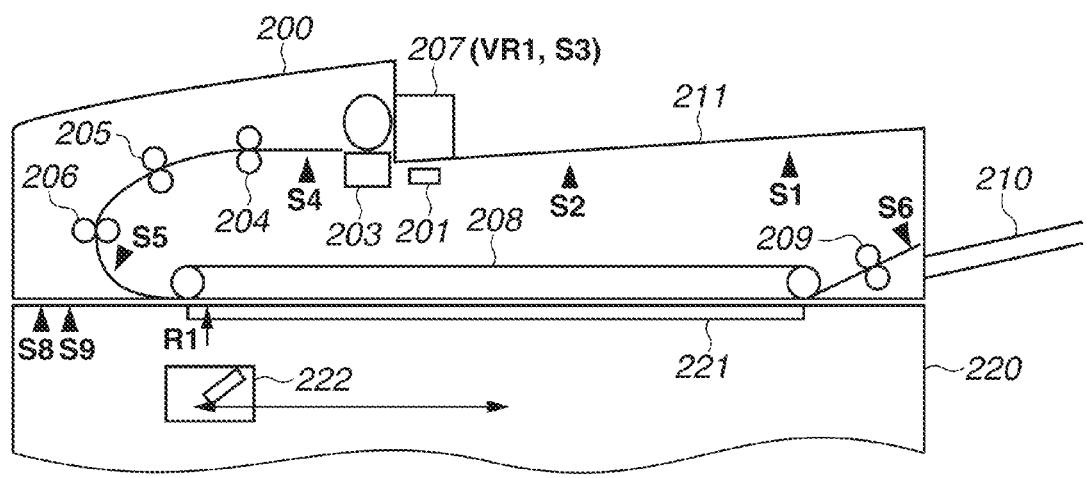
FIG. 2 illustrates a configuration of a scanner in the image forming apparatus according to the exemplary embodiment.

FIG. 2 illustrates an example of a detail configuration of the scanner 130.

The scanner 130 includes a document tray 211 as a document stacking unit, and a document is stacked on a surface of the document tray 211.

In a document feeding unit of the document conveyance apparatus 200, a delivery roller, which is not illustrated, as a delivery unit draws a document bundle stacked on the document tray 211 into a separation unit 203, separates an uppermost sheet on the document bundle one by one, and conveys the sheet to conveyance rollers 204 and 205.

Registration rollers 206 are stopped when a leading edge of the document reaches there, performs skew correction by forming a loop of the document by conveyance of the conveyance rollers 204 and 205, and then conveys the document to a document reading unit.

In the document reading unit of the document conveyance apparatus 200, the document conveyed by the above-described document feeding unit is further conveyed by the registration rollers 206 and a reading belt 208 to a position R1 at a predetermined speed.

When the leading edge of the document reaches the reading position R1, an exposure operation is performed by an optical unit 222 fixed to the reading position R1, and a reading operation can be performed while conveying the document. This reading method is referred to as a moving reading mode.

On the other hand, the reading operation can be performed while moving the optical unit 222 in such a manner that the document is stopped when the leading edge of the document reaches the reading position R1, and the optical unit 222 performs exposure and scan thereon. This reading method is referred to as a fixed reading mode.

When reading of the document is completed, the document is conveyed to a document discharge unit by the reading belt 208. In the document discharge unit, the document is discharged to a discharge tray 210 by discharge rollers 209.

In FIG. 2, various sensors S1 to S6, and VR1 are arranged in the document conveyance apparatus 200.

A large size detection sensor S1 and a small size detection sensor S2 detect a length of a document on the document tray 211. In addition, a width detection volume VR1 and a width detection sensor S3, which are not illustrated, are installed in a document width guide 207, and thus a width of a document can be detected.

A size sensor S4 detects a leading edge and a trailing edge of a document and thus detects the document separated and conveyed and also measures a length of the document at the same time. A read sensor S5 detects the leading edge of the document and notifies a read signal. A sheet discharge sensor S6 detects the trailing edge of the document to be discharged. A document set sensor S7, which is not illustrated, is also installed for determining whether a document is set on the document tray 211.

In an image reader 220, opening/closing detection sensors S8 and S9 are installed for detecting an opening/closing angle of the document conveyance apparatus 200. When a user places a document on a document positioning glass plate 221, a size of the placed document is specified by the opening/closing detection sensors S8 and S9, a size sensor not illustrated, and the exposure operation. When a user places a document on the document positioning glass plate 221, reading is performed by exposing and scanning the document by the optical unit 222 while moving the optical unit 222 as with the fixed reading mode. The method is a known technique, and a detailed description thereof is omitted.

Next, an operation of the operation unit 150 when an adjustable size mode is set is described with reference to FIG. 3. The adjustable size mode is a mode for the MFP 100 to read a document without a specific size such as an A4 size directly specified by a user as a size of the document. In the case of the adjustable size mode, the MFP 100 executes scanning of the document and determines a size of the document by the size sensor S4 after the scanning.

Figure 3:
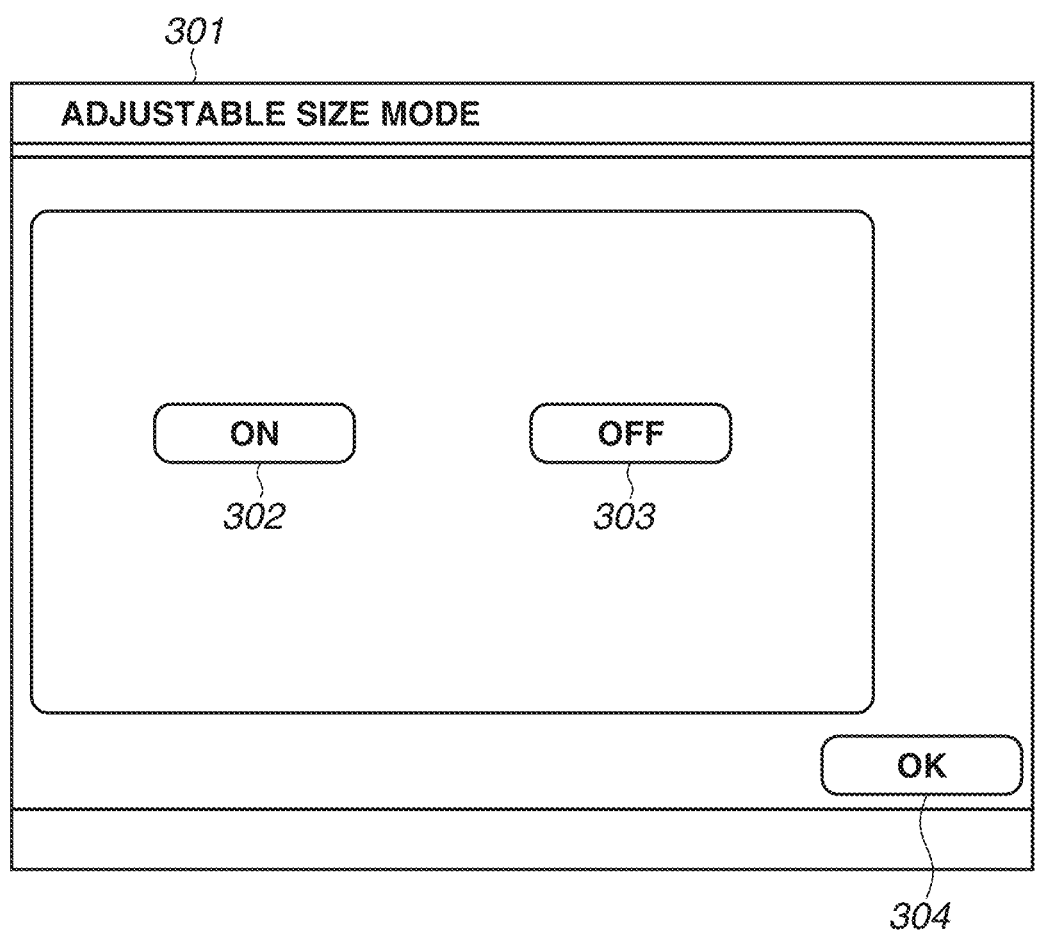
FIG. 3 illustrates an example of an operation screen when an adjustable size mode is set.

FIG. 3 illustrates an example of an operation screen of the operation unit 150 when the adjustable size mode is set.

A user operates the operation unit 150 and thus can display an adjustable size selection screen 301 illustrated in FIG. 3 on a display unit of the operation unit 150.

On the adjustable size selection screen 301, buttons for switching ON and OFF of the adjustable size mode (an ON button 302 and an OFF button 303) are displayed. An adjustable size mode OFF state (i.e., a state in which the OFF button 303 is selected) is set as a default.

When intending to perform scanning in the adjustable size mode, a user selects the ON button 302 and presses an OK button 304. Further when intending to release the adjustable size mode, a user selects the OFF button 303 and presses the OK button 304. As described above, a user can set ON/OFF of the adjustable size mode. The arrangement of the screen is merely an example and not limited thereto.

Next, a magnification control operation when a document size is determined before scanning is described with reference to FIGS. 4A and 4B.

FIGS. 4A and 4B illustrate the magnification control operation when the document size is determined before scanning, and components same as those in FIG. 2 are denoted by the same reference numerals. According to the present exemplary embodiment, a case is described in which an upper right of a document is set as an output reference position (a position to be a reference when the document is enlarged), however, the output reference position may be any position in the document such as lower right, upper left, lower left, upper center, or lower center.

FIG. 4A illustrates a state in which a document 401 is placed on the document tray 211 and conveyed from a right direction to a left direction of the drawing side by the conveyance rollers 205 and scanned. In this case, the document is scanned from left to right and thus scanned as in a direction 402 in FIG. 4B.

For example, when a document image is output by being magnified to 200% to a sheet having a size same as the document, a portion 403 is enlarged and output in the case of the upper right reference. In this case, a portion in the document other than the portion 403 is not output and unnecessary. Thus, in order to reduce the image memory 119 and improve the efficiency of the image processing, the MFP 100 records only a necessary portion of image data (image data 405) in the image memory 119 when scanning (reading 404). The MFP 100 rotates (406) the image recorded in the image memory 119 by 180 degrees to output in the upper right reference, and generates image data 407. Further, the MFP 100 varies magnification (408) of the image data 407 to generate image data 409 of the upper right reference.

According to the above-described operation, normally, it is necessary to perform rotation and magnification processing on image data corresponding to main scanning*sub-scanning of the document 401, however, since the portion 403 is clipped, the processing is only necessary for image data corresponding to (main scanning/2)*(sub-scanning/2), and a processing man-hour can be reduced.

As described above, when the document size is determined before scanning, only a necessary portion is recorded in the image memory 119 when scanning is performed, so that a usage amount of the image memory and the processing man-hour are reduced.

Next, a case in which a magnification control operation of the adjustable size mode is processed similarly to that of the regular size is described with reference to FIG. 5.

FIG. 5 illustrates an operation when the magnification control operation of the adjustable size mode is processed similarly to that of the regular size.

In the case of the adjustable size mode, scanning of the document is executed, and a size of the document is determined by the size sensor S4 after the scanning.

The scan operation is performed on the document from left to right as with the case that the document size is determined before the scanning as illustrated in FIGS. 4A and 4B. However, in the adjustable size mode, a sub-scanning length is not fixed, and it is not known from which position recording is started in the memory. Therefore, the MFP 100 starts reading from a left edge of a document and records a size 501 necessary after enlargement in the image memory 119 on the assumption of a maximum size that the apparatus can read.

For example, when the maximum size is A3, a length in the sub-scanning direction is 420 mm, and magnification is set to 200%, image data of a length of 210 mm in the sub-scanning direction is recorded from the left edge of the document in the image memory. In other words, image data 502 is recorded in the image memory 119. Then, the image data 502 is rotated (503) by 180 degrees to obtain image data 504. The image data 504 is magnified (505), and image data 506 is generated. However, in this operation, a reference position is different from that in the case of the regular size as illustrated in FIGS. 4A and 4B, and if a user thinks that the magnification is performed using the upper right of the document as the reference as with the case of the regular size, an output will not be what the user intended.

Next, a reading operation in the magnification according to the first exemplary embodiment is described with reference to FIGS. 6 and 7.

FIG. 6 is a flowchart illustrating an example of switching processing of the scan operation accompanied with the magnification in the MFP 100 according to the first exemplary embodiment. The processing in the flowchart is realized by the CPU 111 of the MFP 100 reading and executing a program stored in a storage apparatus such as the ROM 113 and the storage unit 114.

FIG. 7 illustrates the scan operation in the adjustable size mode of the MFP 100 according to the first exemplary embodiment.

First, in step S600, the CPU 111 determines whether the magnification setting is performed via the operation unit 150. The magnification setting is performed, for example, by a user via the operation unit 150. When it is determined that the magnification setting is not performed (NO in step S600), the CPU 111 shifts to processing in the equal magnification. The details of the processing in the equal magnification are omitted, however, when scanning is performed in the equal magnification, the MFP 100 prepares (secures) an image memory corresponding to a document image size to be scanned (the maximum size that can be read in the adjustable size mode) in the image memory 119 when performing scanning. For example, when an A4 size document is scanned, the image memory having a size capable of storing image data of a size of 210 mm*297 mm is prepared. When scanning at 8 pixels in one byte and 600 dpi, the MFP 100 prepares the image memory of 7016*4961/84.4 MB for performing the scanning. After preparing the above-described image memory in the image memory 119, the scanner 130 scans the document image in the direction 402 in FIG. 4B and records the image data in the image memory 119.

On the other hand, when it is determined that the magnification setting is performed (YES in step S600), the CPU 111 advances the processing to step S601.

In step S601, the CPU 111 determines whether the mode is the adjustable size mode. When it is determined that the mode is not the adjustable size mode (i.e., the regular size mode, NO in step S601), the CPU 111 advances the processing to step S602.

In step S602, the CPU 111 performs a scan operation setting (i.e., a setting for recording part of scanning) for recording only a necessary portion of the scanned image in the image memory 119 and advances the processing to step S604.

On the other hand, when it is determined that the mode is the adjustable size mode (YES in step S601), the CPU 111 advances the processing to step S603.

In step S603, the CPU 111 performs a scan operation setting (i.e., a setting for recording 100% of scanning) for recording an entire scanned image in the image memory 119 and advances the processing to step S604.

In step S604, the CPU 111 executes the scan operation using the scanner 130 and terminates the processing in the present flowchart.

The scan operation in step S604 is described in detail below.

When the "setting for recording part of scanning" is performed in the above-described step S602, in step S604, the image memory of the size needed after the magnification is prepared in the image memory 119 when scanning is performed and scanning is performed as described with reference to FIGS. 4A and 4B. For example, in the case of the scan operation in which an A4 (210 mm*297 mm) size document is copied at 200% on an A4 size sheet, the image memory which can store image data of a size of (210/2)*(297/2)=105 mm*149 mm is prepared. When scanning at 8 pixels in one byte and 600 dpi, the CPU 111 performs control to prepare the image memory of 3508*2481/81.1 MB and perform scanning. After preparing the image memory of the size needed after the magnification, the scanner 130 scans the document image in the direction 402 in FIG. 4B and records the image data in the image memory 119. At that time, in order to record image data at a position of the portion 403 in FIG. 4B, unnecessary image data scanned by the optical unit 222 is skipped from reading, and recording in the image memory is started from a position 410 in FIG. 4B. For example, in the case of the scan processing in which an A4 size document is magnified to 200% and recorded on an A4 size sheet, image data of (210/2)=105 mm is skipped from reading in the main scanning, and image data of (297/2)=149 mm is skipped from reading in the sub-scanning.

Further, when the "setting for recording 100% of scanning" is performed in the above-described step S603, in the scanning in step S604, the image memory of the maximum size that can be read in the adjustable size mode is prepared in the image memory 119 and scanning is performed. For example, when the maximum size that can be read in the adjustable size mode is an A3 size, 8 pixels, 1 byte, and 600 dpi, the CPU 111 performs control to prepare the image memory of 7016*9921/88.7 MB regardless of the magnification ratio and perform scanning. After preparing the image memory of the maximum size as described above, the scanner 130 scans the document image and records image data in the image memory 119. At that time, recording is performed from an origin point 706 of document image 700 illustrated in FIG. 7 in the image memory 119 without skipping the reading, so that the document image 700 is entirely recorded in the memory like image data 701. The image data 701 is rotated (702) by 180 degrees to obtain image data 703. The image data 703 is magnified (704), and image data 705 is generated. Thus, the image data 705 is generated by varying the magnification of the entire document image 700. It is not illustrated, clipping processing is subsequently performed, and thus an image at a position intended by the user can be output.

As described above, according to the first exemplary embodiment, the CPU 111 does not record image data of the whole of one page generated by reading one page of a document in the case of the magnification and the regular size mode. Alternatively, the CPU 111 performs control to record image data of only a portion necessary for an image after magnification corresponding to the magnification setting in the image memory 119. Further, the CPU 111 performs control to record image data of the whole of one page generated by reading one page of a document in the image memory 119 and clip only a necessary portion after magnification in the case of the magnification and the adjustable size mode. According to such configuration, an output magnified based on a position intended by a user can be similarly obtained in either case of the regular size mode and the adjustable size mode.

According to a second exemplary embodiment, an operation is described in which entire document image is recorded in the image memory 119 at the time of scanning, and a portion of the image is clipped before magnification.

As in the first exemplary embodiment, in the scan operation in magnification and the adjustable size mode, if the entire document image is recorded in the image memory, and then the image processing such as rotation and magnification is executed, the entire document image is processed, and thus the processing man-hour and the usage amount of the image memory are increased.

However, a size is determined after the scanning even in the adjustable size mode, so that only image data of a necessary portion is clipped before the subsequent image processing using the determined size, and the subsequent processing man-hour and the usage amount of the image memory 119 can be reduced. According to the second exemplary embodiment, the configuration is described with reference to FIG. 8. A case is described in which an upper right of a document is set as a reference of the enlargement, however, the reference position of the enlargement may be any position in the document such as lower right, upper left, lower left, upper center, or lower center.

Figure 8:
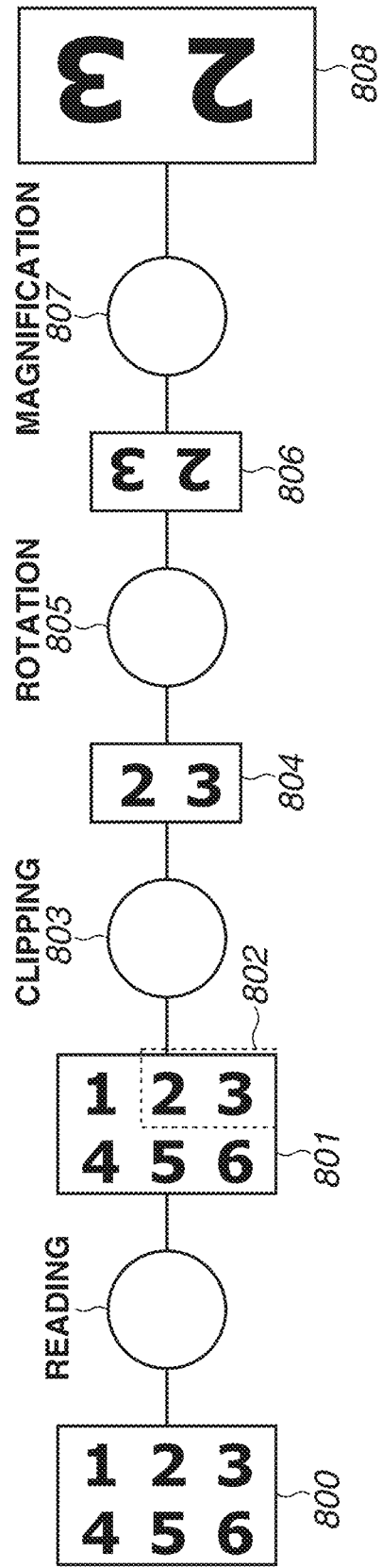
FIG. 8 illustrates a magnification control operation of an adjustable size mode according to a second exemplary embodiment.

FIG. 8 illustrates a scan operation in the adjustable size mode by the MFP 100 according to the second exemplary embodiment.

As described above, when a setting is performed for recording an entire scanned image, entire document image 800 is recorded in the image memory 119 like image data 801. The document size has been determined at this point, and an image size necessary for the subsequent image processing is determined. According to the present exemplary embodiment, an example is described in which the magnification to 200% is set with reference to the upper right of the document. In this case, the necessary image data size is a size 802. Thus, image data having the size 802 is clipped (803) from the image data 801 and stored in the memory (as image data 804). Then, the clipped image data 804 is rotated (805) by 180 degrees to obtain image data 806. The image data 806 is magnified (807), and image data 808 is generated. In other words, an image magnified to 200% is generated with reference to the upper right of the document image.

As described above, the second exemplary embodiment includes the configuration in which only a necessary portion is clipped before performing the image processing such as rotation and magnification in the case of the magnification and the adjustable size mode. According to the configuration, the usage amount of the image memory can be reduced, and the processing man-hour can be reduced since an image data size becomes smaller than that of when the entire image is processed.

Generally, an output reference position (i.e., a position as reference of magnification) of an image is determined for each image forming apparatus by default. However, a user wants to specify an arbitrary position to perform enlargement in some cases in the enlargement setting and the like. According to a third exemplary embodiment, a configuration is described below for specifying an arbitrary position as the image output reference position.

Figure 9:
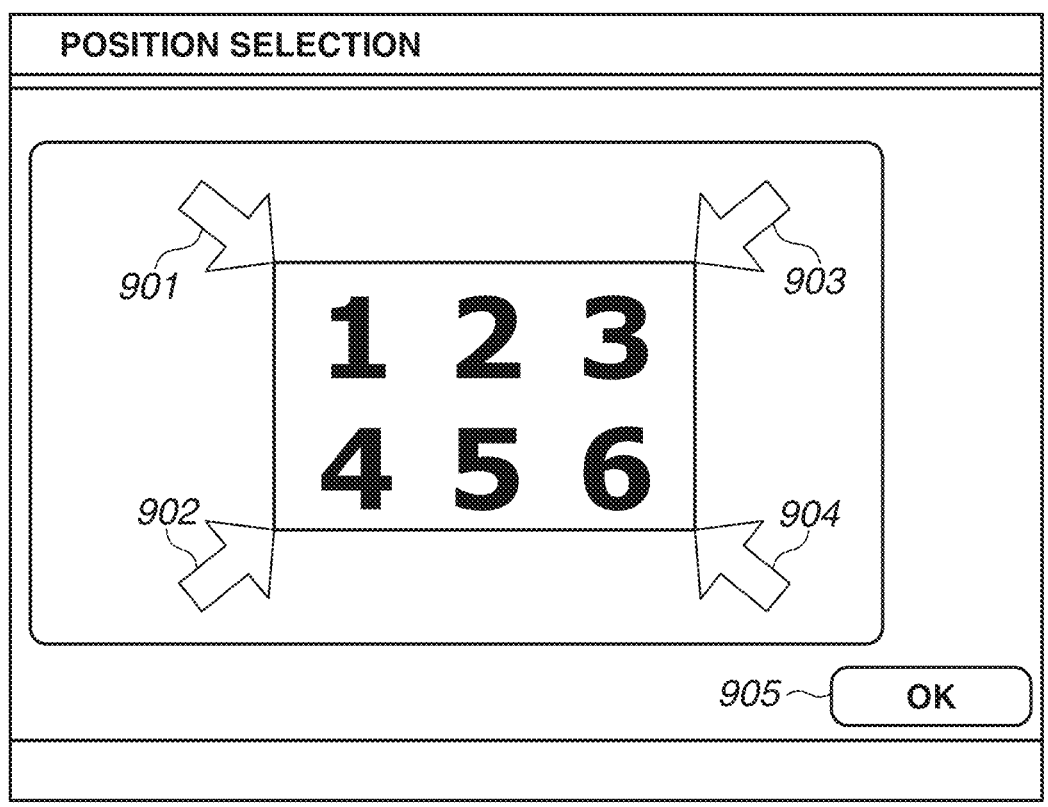
FIG. 9 illustrates an example of an operation screen when an output reference position of an image is specified.

When an output reference position of an image is specified, it may be configured to prompt a user to input a reference position by the operation unit 150 as illustrated in FIG. 9 and specify an arbitrary position as the reference position.

FIG. 9 illustrates an example of an operation screen of the operation unit 150 when the image output reference position is specified.

A user operates the operation unit 150 and thus can display an output reference position selection screen 900 illustrated in FIG. 9 on the display unit of the operation unit 150.

When an OK button 905 is pressed in a state in which an icon 901 is selected, an upper left of the document will be reference. When the OK button 905 is pressed in a state in which an icon 902 is selected, a lower left of the document will be reference. When the OK button 905 is pressed in a state in which an icon 903 is selected, an upper right of the document will be reference. When the OK button 905 is pressed in a state in which an icon 904 is selected, a lower right of the document will be reference.

Thus, when the icon 903 or the icon 904 is selected, as in the case of the examples according to the first and the second exemplary embodiments, the output reference position is on the right side of the document and set on a side to be read later when the scanner 130 reads the document (a downstream side of reading). On the other hand, when the icon 901 or the icon 902 is selected, different from the case of the examples according to the first and the second exemplary embodiments, the output reference position is on the left side of the document and set on a side to be read earlier when the scanner 130 reads the document (an upstream side of reading).

A magnification operation in the adjustable size mode when the reference position is on the upper left of the document is described below with reference to FIG. 10.

Figure 10:
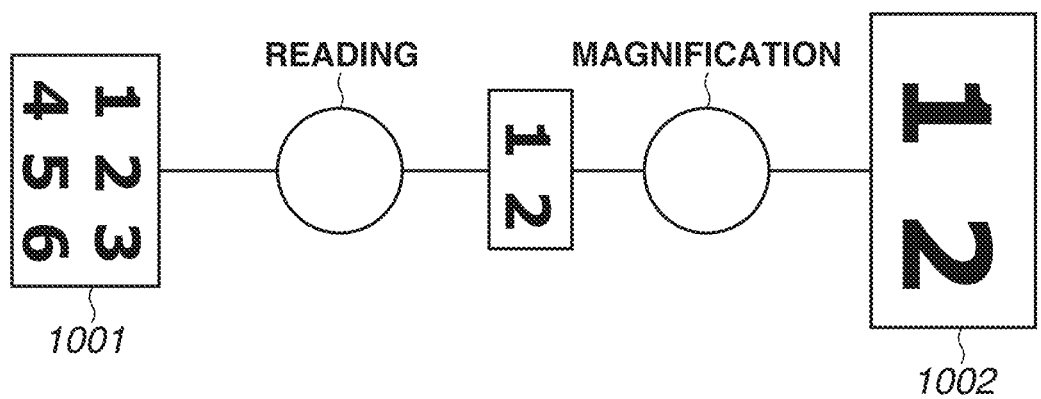
FIG. 10 illustrates a magnification control operation of an adjustable size mode when an output reference position is set on a left side.

FIG. 10 illustrates a scan operation in the adjustable size mode of the MFP 100 according to the third exemplary embodiment when the reference position is on the upper left of the document.

When the upper left of the document is the reference, if recording in the image memory 119 is performed from a reading position 1001 even in the adjustable size mode, image data can be output on the upper left reference as an image 1002. Thus, even in the adjustable size mode, the entire document image is not necessary to be recorded in the image memory 119, and the usage amount of the image memory and the processing man-hour can be reduced by switching the operation according to the reference position.

A configuration for switching the scan operation when causing a user to set the reference position is described below with reference to FIG. 11.

Figure 11:
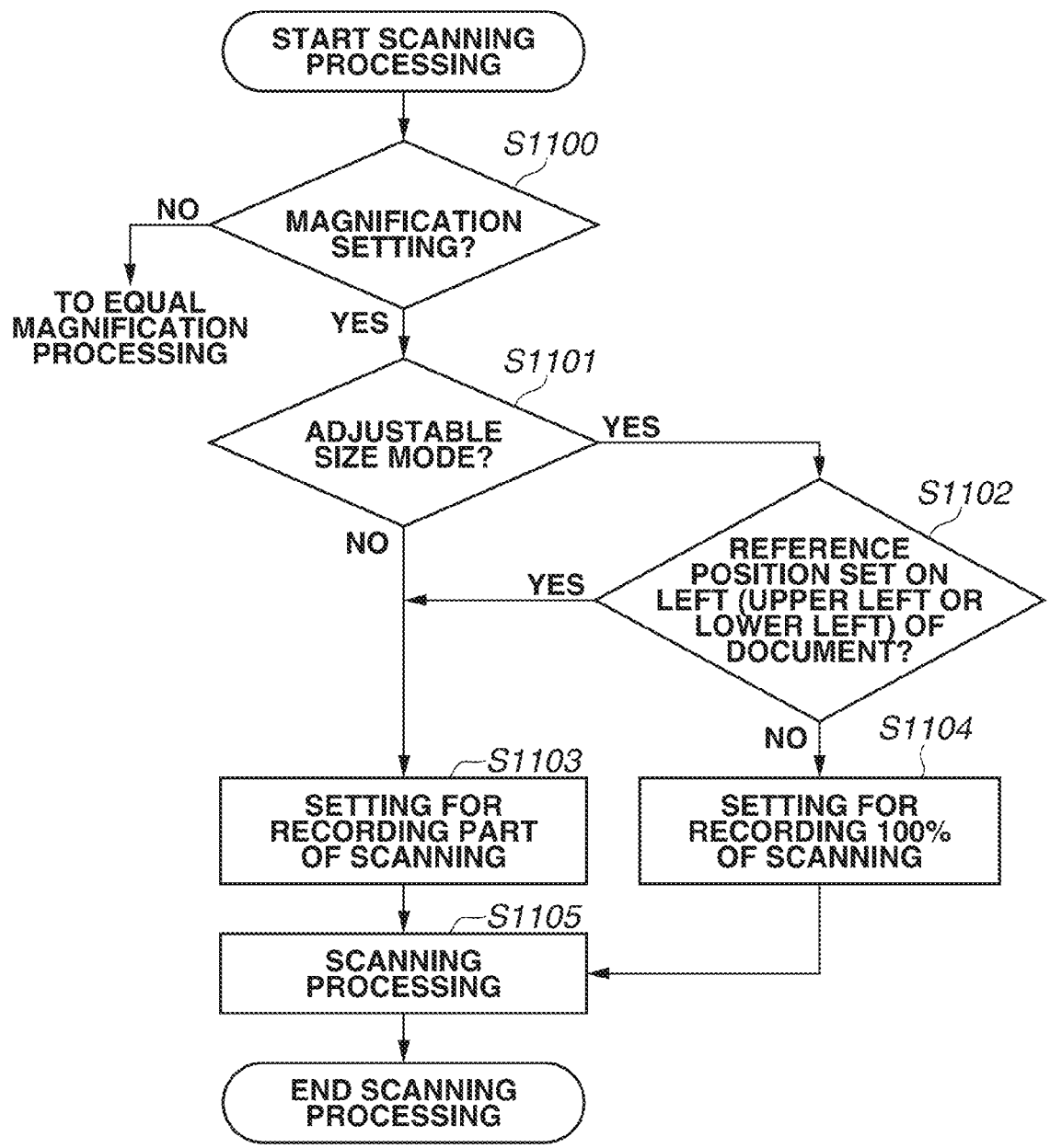
FIG. 11 is a flowchart illustrating an example of a magnification control operation according to a third exemplary embodiment.

FIG. 11 is a flowchart illustrating an example of switching processing of the scan operation accompanied with the magnification in the MFP 100 according to the third exemplary embodiment. The processing in the flowchart is realized by the CPU 111 of the MFP 100 reading and executing a program stored in a storage apparatus such as the ROM 113 and the storage unit 114.

First, in step S1100, the CPU 111 determines whether the magnification setting is performed. When it is determined that the magnification setting is not performed (NO in step S1100), the CPU 111 shifts to the processing in the equal magnification. The details of the processing in the equal magnification are omitted.

On the other hand, when it is determined that the magnification setting is performed (YES in step S1100), the CPU 111 advances the processing to step S1101.

In step S1101, the CPU 111 determines whether the mode is the adjustable size mode. When it is determined that the mode is not the adjustable size mode (i.e., the regular size mode, NO in step S1101), the CPU 111 advances the processing to step S1103. Step S1103 is described below.

On the other hand, when it is determined that the mode is the adjustable size mode (YES in step S1101), the CPU 111 advances the processing to step S1102.

In step S1102, the CPU 111 determines whether the output reference position is set on the left side of the document (the upper left or the lower left). When it is determined that the reference position is set on the left side (the upper left or the lower left, YES in step S1102), the CPU 111 advances the processing to step S1103.

In step S1103, the CPU 111 performs the scan operation setting (the setting for recording part of scanning) for recording only a necessary portion of the scanned image in the image memory 119 and advances the processing to step S1105.

On the other hand, when it is determined that the reference position is not set on the left side (the upper left or the lower left) (i.e., set on the upper right or the lower right, NO in step S1102), the CPU 111 advances the processing to step S1104.

In step S1104, the CPU 111 performs the scan operation setting (the setting for recording 100% of scanning) for recording the entire scanned image in the memory and advances the processing to step S1105.

In step S1105, the CPU 111 executes the scan operation using the scanner 130 and terminates the processing in the present flowchart.

As described above, according to the third exemplary embodiment, the operation of the scan processing is switched in response to the output reference position in the case of the magnification setting. Only a portion of the image data is recorded in the image memory in response to the output reference position, and thus the usage amount of the image memory can be reduced, and the processing man-hour can be reduced by the reduction of the image data size.

There is a reading apparatus capable of simultaneously scanning front and rear sides of a two-sided document at present. According to a fourth exemplary embodiment, a configuration is described which can simultaneously scan front and rear sides of a two-sided document.

Figure 12:
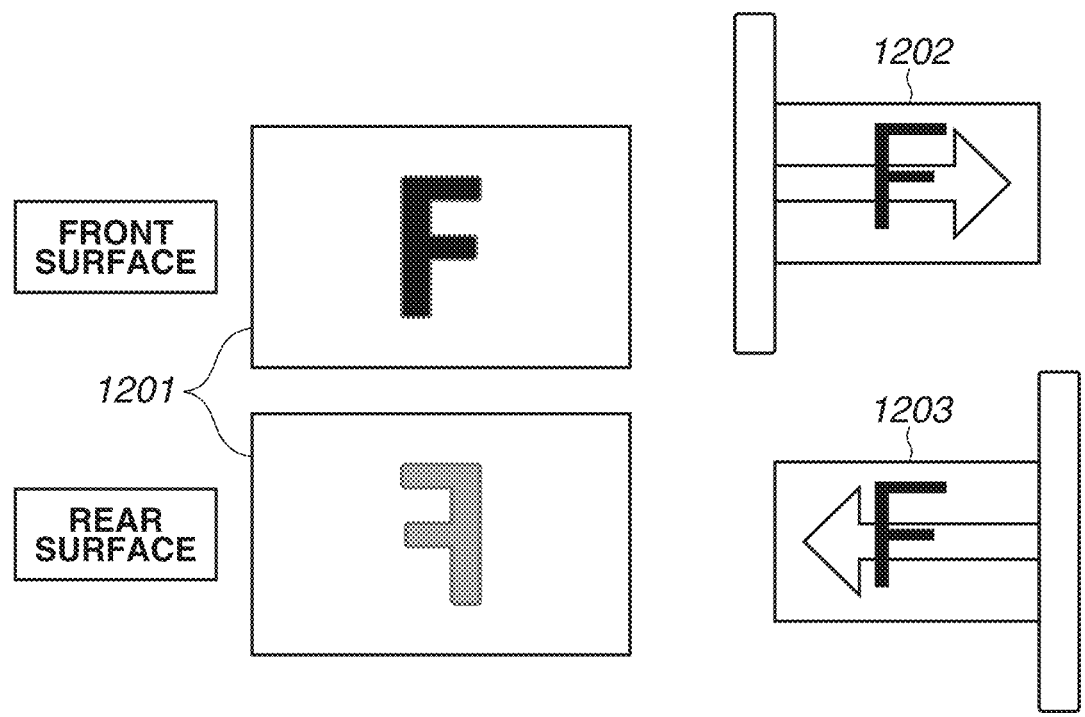
FIG. 12 illustrates a scan operation of a scanner capable of performing simultaneous scanning on both sides.

FIG. 12 illustrates a simultaneous scanning operation on both sides by the MFP 100 according to the fourth exemplary embodiment.

When a two-sided document 1201 illustrated in FIG. 12 is scanned by an apparatus capable of simultaneously scanning of both sides, a front surface 1202 of the document is scanned from the left side of the document and a rear surface 1203 thereof is scanned from the right side of the document. Thus, when the reference position is set on the right (the upper right or the lower right), regarding an image on the front surface of the document, the image including the reference position cannot be output if the image is recorded in the order of scanning in the image memory. On the other hand, regarding the image on the rear surface of the document, when the image is recorded in the order of scanning in the image memory, the image including the reference position can be output.

To the contrary, when the reference position is set on the left side (the upper left or the lower left), regarding the image on the front surface of the document, the image including the reference position can be output by recording the image in the order of scanning in the image memory. On the other hand, regarding the image on the rear surface of the document, the image including the reference position cannot be output if the image is recorded in the order of scanning in the image memory.

An operation for outputting an image at the reference position intended by a user by switching the operation on the front surface and the rear surface is described below with reference to FIG. 13.

Figure 13:
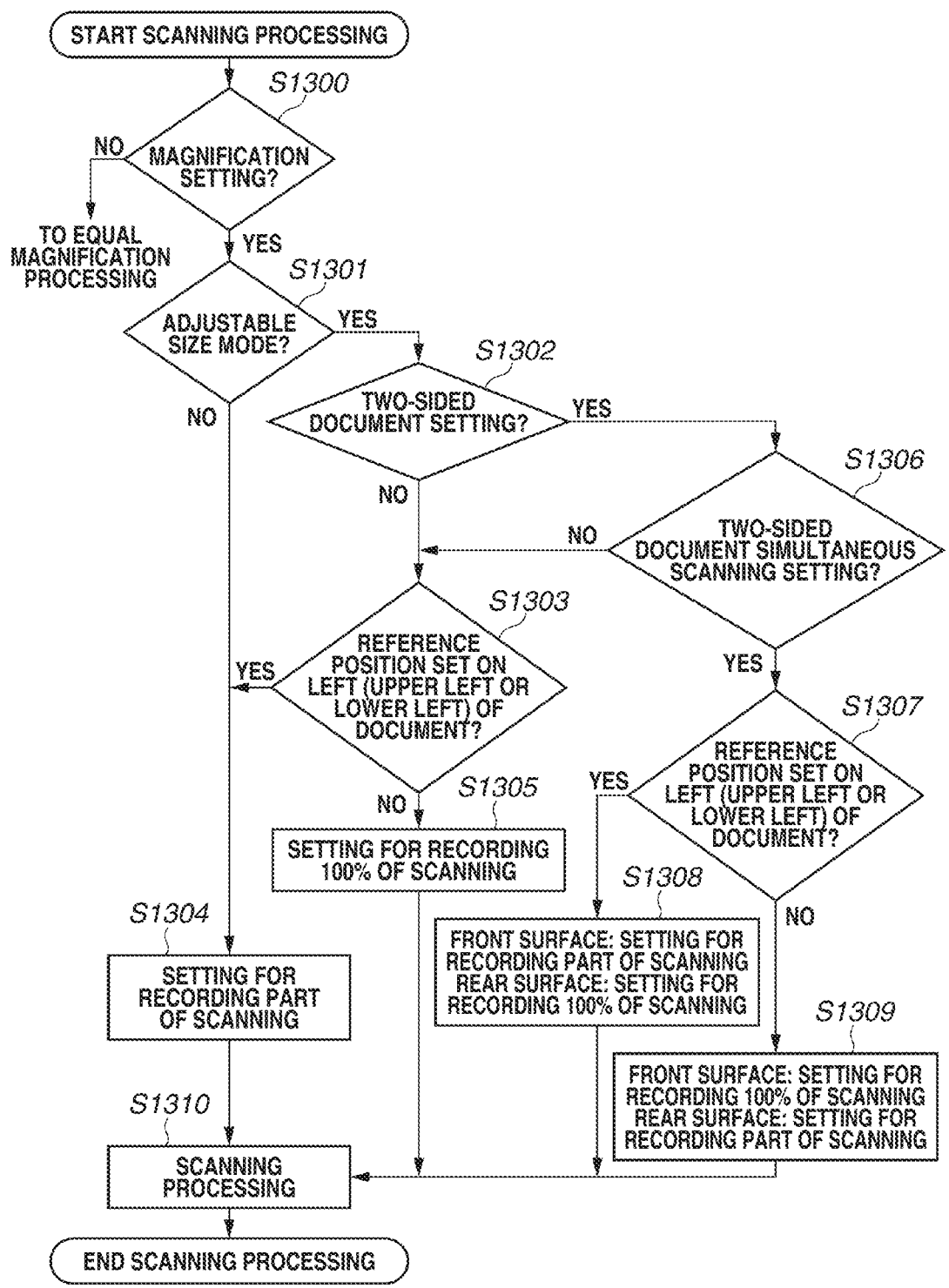
FIG. 13 is a flowchart illustrating an example of a magnification control operation according to a fourth exemplary embodiment.

FIG. 13 is a flowchart illustrating an example of the switching processing of the scan operation accompanied with the magnification in the MFP 100 according to the fourth exemplary embodiment. The processing in the flowchart is realized by the CPU 111 of the MFP 100 reading and executing a program stored in a storage apparatus such as the ROM 113 and the storage unit 114.

First, in step S1300, the CPU 111 determines whether the magnification setting is performed. When it is determined that the magnification setting is not performed (NO in step S1300), the CPU 111 shifts to the processing in the equal magnification. The details of the processing in the equal magnification are omitted.

On the other hand, when it is determined that the magnification setting is performed (YES in step S1300), the CPU 111 advances the processing to step S1301.

In step S1301, the CPU 111 determines whether the mode is the adjustable size mode. When it is determined that the mode is not the adjustable size mode (i.e., the regular size mode, NO in step S1301), the CPU 111 advances the processing to step S1304.

On the other hand, when it is determined that the mode is the adjustable size mode (YES in step S1301), the CPU 111 advances the processing to step S1302.

In step S1302, the CPU 111 determines whether the two-sided document setting is performed. When it is determined that the two-sided document setting is not performed (NO in step S1302), the CPU 111 advances the processing to step S1303. The processing in steps S1303 to S1305 is similar to that in steps S1102 to S1104 in FIG. 11, so that the description thereof is omitted.

On the other hand, when it is determined that the two-sided document setting is performed (YES in step S1302), the CPU 111 advances the processing to step S1306.

In step S1306, the CPU 111 determined whether a two-sided document simultaneous scan setting is performed. When it is determined that the two-sided document simultaneous scan setting is not performed (NO in step S1306), the CPU 111 advances the processing to step S1303.

On the other hand, when it is determined that the two-sided document simultaneous scan setting is performed (YES in step S1306), the CPU 111 advances the processing to step S1307.

In step S1307, the CPU 111 determined whether the output reference position is set on the left side of the document (the upper left or the lower left). When it is determined that the reference position is set on the left side (the upper left or the lower left) (YES in step S1307), the CPU 111 advances the processing to step S1308.

In step S1308, the CPU 111 performs the setting for recording part of scanning as the scan setting of the front surface, performs the setting for recording 100% of scanning as the scan setting of the rear surface, and advances the processing to step S1310. The setting for recording part of scanning is the scan operation setting for recording only the necessary portion of the scanned image in the image memory 119. Further, the setting for recording 100% of scanning is the scan operation setting for recording the entire scanned image in the memory.

On the other hand, when it is determined that the reference position is not set on the left side (the upper left or the lower left) (NO in step S1307), the CPU 111 advances the processing to step S1309.

In step S1309, the CPU 111 performs the setting for recording 100% of scanning as the scan setting of the front surface, performs the setting for recording part of scanning as the scan setting of the rear surface, and advances the processing to step S1310.

In step S1310, the CPU 111 executes the scan operation using the scanner 130 and terminates the processing in the present flowchart.

As described above, the fourth exemplary embodiment is configured to switch the scan operation on the front surface and the rear surface of the two-sided document. Accordingly, an output product intended by a user can be provided regardless of the output reference position. In addition, if only a portion of the image data is recorded in the image memory according to an output reference value, the usage amount of the image memory can be reduced, and the processing man-hour can be reduced by the reduction of the image data size.

According to the above-described first exemplary embodiment, the configuration is described in which the scan processing is performed by setting to read the entire document image in the case of the magnification and the adjustable size mode. In the adjustable size mode, a length of a document in the sub-scanning direction cannot be determined until scanning is executed, however, depending on the scanner 130, a length of the document in the main scanning direction can be determined before scanning by the document width guide 207 in some cases. In such a case, reading may be skipped in the main scanning in the magnification, and the usage amount of the image memory and the processing man-hour can be reduced.

A reading operation in the magnification according to the fifth exemplary embodiment, in other words, an operation for skipping reading in the main scanning in the magnification and the adjustable size mode and enlarging the image using the upper right of the document as the reference is described below with reference to FIGS. 14 and 15.

Figure 14:
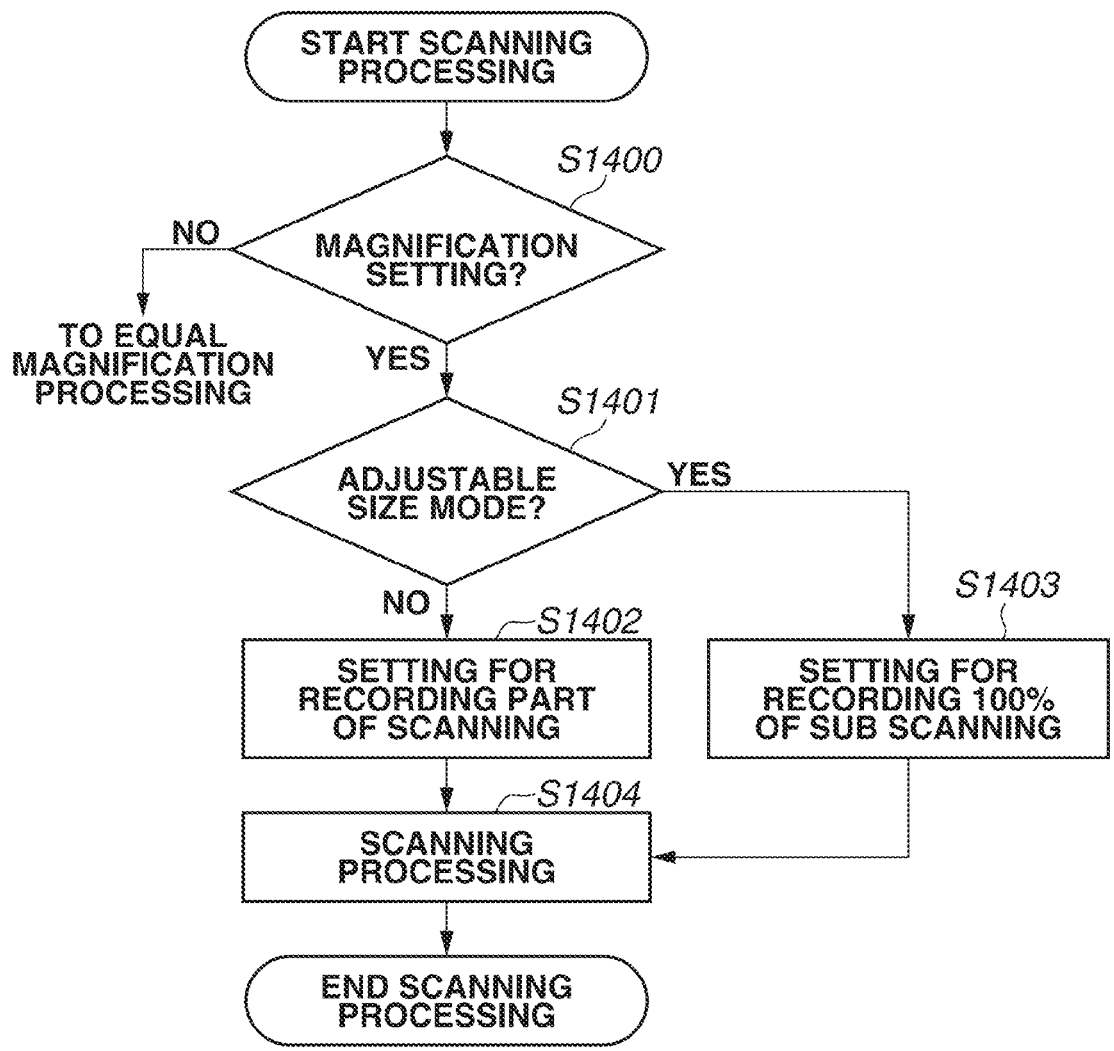
FIG. 14 is a flowchart illustrating an example of a magnification control operation according to a fifth exemplary embodiment.

FIG. 14 is a flowchart illustrating an example of the switching processing of the scan operation accompanied with the magnification in the MFP 100 according to the fifth exemplary embodiment. The processing in the flowchart is realized by the CPU 111 of the MFP 100 reading and executing a program stored in a storage apparatus such as the ROM 113 and the storage unit 114.

Figure 15:
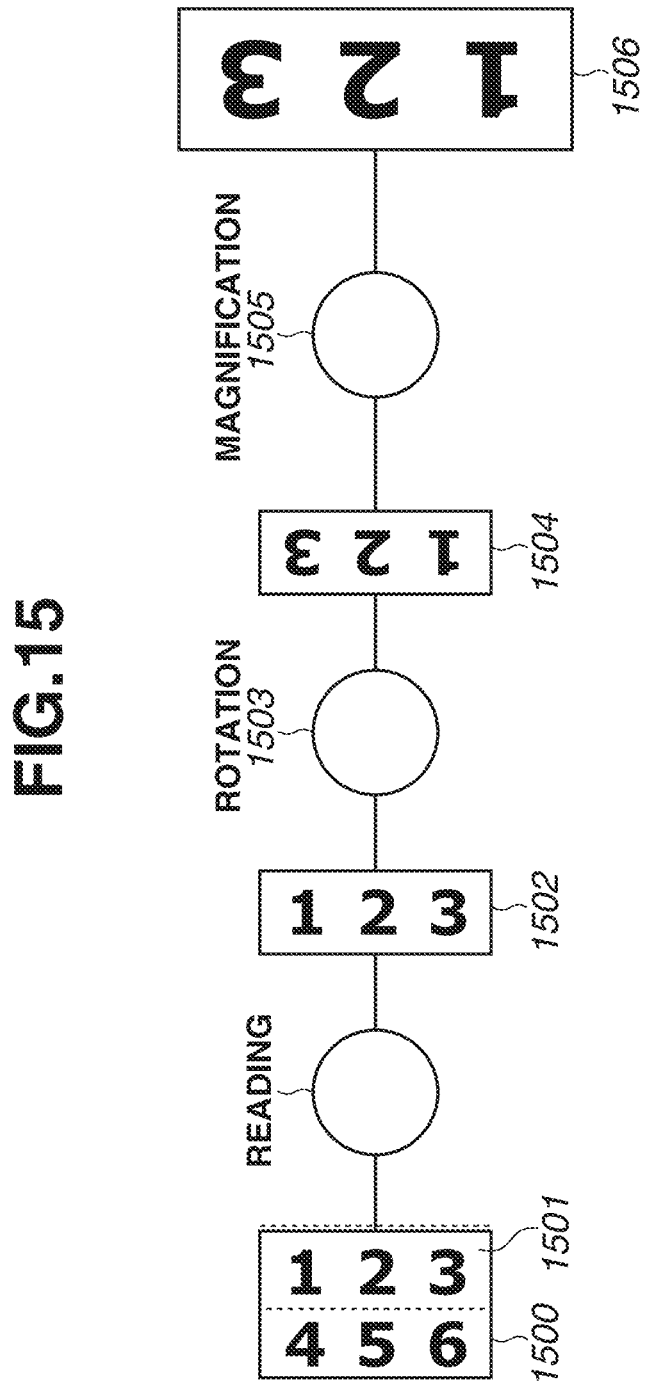
FIG. 15 illustrates a magnification control operation according to the fifth exemplary embodiment.

FIG. 15 illustrates the scan operation in the adjustable size mode accompanied with the magnification in the MFP 100 according to the fifth exemplary embodiment.

First, the processing in steps S1400 to S1402 is similar to that in steps S600 to S602 in FIG. 6, so that the description thereof is omitted.

In step S1401, when it is determined that the mode is the adjustable size mode (YES in step S1401), the CPU 111 advances the processing to step S1403.

In step S1403, the CPU 111 performs a setting for recording 100% of sub-scanning (a scan operation setting for recording an entire scanned image in the sub-scanning in the memory, however, skipping reading in the main scanning according to a magnification ratio) and advances the processing to step S1404.

In step S1404, the CPU 111 executes the scan operation using the scanner 130 and terminates the processing in the present flowchart.

The scan operation in step S1404 is described in detail below.

When the "setting for recording 100% of sub-scanning" is performed in the above-described step S1403, in step S1404, the scanner 130 skips reading in the main scanning in consideration of the magnification, but records an entire image in the sub-scanning, so that image data at a position 1501 in FIG. 15 is recorded in the image memory. Subsequently, the image processing unit 118 rotates (1503) recorded image data 1502 by 180 degrees to obtain image data 1504, and further varies magnification (1505) of the image data 1504, so that image data 1506 is generated. The image data 1504 is image data including the upper right of a document 1500, and thus the position intended by a user can be output. In addition, regarding the main scanning, if only a portion of the image data is recorded, the usage amount of the image memory 119 can be reduced, and the processing man-hour can be reduced by the reduction of the image data size.

As described above, according to the present invention, an efficient memory use can be realized in the scan operation in the magnification setting, and an image at a position intended by a user can be magnified and output in either case of the regular size mode and the adjustable size mode. In other words, an output product intended by a user can be provided.

Accordingly, the conventional issue that an output as a user intended cannot be obtained in the adjustable size mode in which a document size is not determined before scanning can be solved, and a user-friendly image forming apparatus which can realize the efficient memory use can be provided.

Configurations and contents of the above-described various data pieces are not limited thereto, and data may include various configurations and contents according to an application and a purpose.

The exemplary embodiments have been described above, however, the present invention can be realized as an exemplary embodiment of, for example, a system, an apparatus, a method, a program, or a recording medium. More specifically, the present invention may be applied to a system including a plurality of devices and an apparatus including a single device.

Further, all configurations combining each of the above-described exemplary embodiments may also be included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-125287, filed Jun. 23, 2015, which is hereby incorporated by reference herein in its entirety.

What is claimed is:

1. An image forming apparatus comprising:
a reading unit configured to read a document to generate image data;
a processor and a memory storing computer code that, when executed by the processor, causes the image forming apparatus to function as:
a storage unit configured to store the image data generated by the reading unit;
a setting unit configured to perform a magnification setting for varying magnification of the image data stored in the storage unit; and
a control unit configured to, in the case where the setting unit performs the magnification setting and a document size to be read by the reading unit is able to be determined before reading, perform control to execute first processing for not writing image data of an entire page generated by the reading unit reading one page of a document in the storage unit but writing image data of only a portion necessary for an image after varying the magnification in response to the magnification setting in the storage unit, and in the case where the document size is not able to be determined before reading, perform control to execute second processing for writing image data of an entire page generated by the reading unit reading one page of the document in the storage unit.

2. The image forming apparatus according to claim 1, wherein the processor and the memory storing computer code that, when executed by the processor, further causes the image forming apparatus to function as:
a clipping unit configured to clip image data of a necessary portion as an image after varying the magnification in response to the magnification setting from the image data stored in the storage unit by the second processing.

3. The image forming apparatus according to claim 1, wherein the processor and the memory storing computer code that, when executed by the processor, further comprising causes the image forming apparatus to function as:
a selection unit configured to receive a selection of an output reference position of a document from a user,
wherein, in the case where a side of the document to be read earlier by the reading unit is selected by the selection unit as the output reference position, the control unit performs control to execute the first processing if the document size is not able to be determined before reading.

4. The image forming apparatus according to claim 1, wherein
the reading unit is capable of simultaneously reading both sides of a document, and
in the case where both sides of the document are simultaneously read and the document size is not able to be determined before reading, the control unit performs control to execute the second processing on image data to be generated by reading a front surface of the document and to execute the first processing on image data to be generated by reading a rear surface of the document.

5. The image forming apparatus according to claim 4, wherein the processor and the memory storing computer code that, when executed by the processor, further causes the image forming apparatus to function as:
a selection unit configured to receive a selection of an output reference position of a document from a user,
wherein, in the case where a side of a document to be read earlier by the reading unit is selected by the selection unit as the output reference position and both sides of the document are simultaneously read, the control unit performs control to execute the first processing on image data to be generated by reading a front surface of the document and to execute the second processing on image data to be generated by reading a rear surface of the document even if the document size is not able to be determined before reading.

6. The image forming apparatus according to claim 1, wherein, in the case where a size of a document in a main scanning direction is able to be determined and a size of the document in a sub-scanning direction is not able to be determined before the reading unit reads the document, the control unit performs control to write image data of only a portion necessary for an image after varying the magnification in response to the magnification setting in the storage unit regarding the main scanning direction and to write image data of an entire page in the storage unit regarding the sub-scanning direction.

7. A method for controlling an image forming apparatus including a reading unit configured to read a document to generate image data, a storage unit configured to store the image data generated by the reading unit, and a setting unit configured to perform a magnification setting for varying magnification of the image data stored in the storage unit, the method comprising:
  in the case where the setting unit performs the magnification setting and a document size to be read by the reading unit is able to be determined before reading, executing first processing for not writing image data of an entire page generated by the reading unit reading one page of a document in the storage unit but writing image data of only a portion necessary for an image after varying the magnification in response to the magnification setting in the storage unit; and
  in the case where the setting unit performs the magnification setting and the document size is not able to be determined before reading, executing second processing for writing image data of an entire page generated by the reading unit reading one page of the document in the storage unit.

8. A non-transitory storage medium storing a program for causing a computer to execute a method for controlling an image forming apparatus including a reading unit configured to read a document to generate image data, a storage unit configured to store the image data generated by the reading unit, and a setting unit configured to perform a magnification setting for varying magnification of the image data stored in the storage unit, the method comprising:
  in the case where the setting unit performs the magnification setting and a document size to be read by the reading unit is able to be determined before reading, executing first processing for not writing image data of an entire page generated by the reading unit reading one page of a document in the storage unit but writing image data of only a portion necessary for an image after varying the magnification in response to the magnification setting in the storage unit; and
  in the case where the setting unit performs the magnification setting and the document size is not able to be determined before reading, executing second processing for writing image data of an entire page generated by the reading unit reading one page of the document in the storage unit.

* * * * *